(12) United States Patent
Wieker et al.

(10) Patent No.: US 12,314,359 B2
(45) Date of Patent: May 27, 2025

(54) DYNAMIC USER AUTHENTICATION

(71) Applicant: Capital One Services, LLC, McLean, VA (US)

(72) Inventors: Jeffrey Carlyle Wieker, Falls Church, VA (US); Clayton Johnson, Edgewood, MD (US)

(73) Assignee: Capital One Services, LLC, McLean, VA (US)

( * ) Notice: Subject to any disclaimer, the term of this patent is extended or adjusted under 35 U.S.C. 154(b) by 238 days.

(21) Appl. No.: 17/457,297

(22) Filed: Dec. 2, 2021

(65) Prior Publication Data

US 2023/0177126 A1 Jun. 8, 2023

(51) Int. Cl.
*G06F 21/31* (2013.01)
(52) U.S. Cl.
CPC ................... *G06F 21/316* (2013.01)
(58) Field of Classification Search
CPC . G06F 21/316; G06F 2221/2111; G06F 21/31
USPC .......................................................... 726/1
See application file for complete search history.

(56) References Cited

U.S. PATENT DOCUMENTS

| | | | | |
|---|---|---|---|---|
| 2013/0283372 A1* | 10/2013 | Tsukamoto | ............. | G06F 21/32 726/18 |
| 2015/0324559 A1* | 11/2015 | Boss | ...................... | G06Q 50/01 726/1 |
| 2016/0063503 A1* | 3/2016 | Kobres | .................. | G06Q 20/40 705/18 |
| 2016/0110528 A1* | 4/2016 | Gupta | ..................... | H04L 63/08 726/19 |
| 2017/0111373 A1* | 4/2017 | Morton | ................. | H04L 63/126 |
| 2019/0114404 A1* | 4/2019 | Nowak | ................. | H04W 12/06 |
| 2021/0149538 A1* | 5/2021 | Lapointe | ................ | H03K 17/97 |
| 2021/0303667 A1* | 9/2021 | Senn | ....................... | G06F 21/32 |
| 2022/0261462 A1* | 8/2022 | Tokuyama | .............. | G06F 21/32 |
| 2023/0052407 A1* | 2/2023 | McGrandle | ........ | G06Q 20/4014 |

OTHER PUBLICATIONS

Lee et al., "Implicit Sensor-based Authentication of Smartphone Users with Smartwatch," HASP 2016, Website: http://dx.doi.org/10.1145/2948618.2948627, Jun. 18, 2016, 9 Pages.
Lee et al., "Implicit Smartphone User Authentication with Sensors and Contextual Machine Learning," Website: http://arxiv.org/abs/1708.09754v1, Aug. 30, 2017, 13 Pages.

* cited by examiner

*Primary Examiner* — Jacob Lipman
(74) *Attorney, Agent, or Firm* — Harrity & Harrity, LLP

(57) ABSTRACT

In some implementations, a mobile device may receive, from a first sensor of the mobile device, measurements indicating a location of the mobile device. The mobile device may further receive, from a second sensor of the mobile device, measurements associated with a grip of the user on the mobile device. Accordingly, the mobile device may input indicators of the location and the grip to a model that outputs an indication associated with suspicious activity. The mobile device may present, while the user is viewing a screen associated with an application using the model, one or more prompts. The mobile device may therefore determine whether to allow the user to continue viewing the screen based on one or more responses to the one or more prompts.

20 Claims, 9 Drawing Sheets

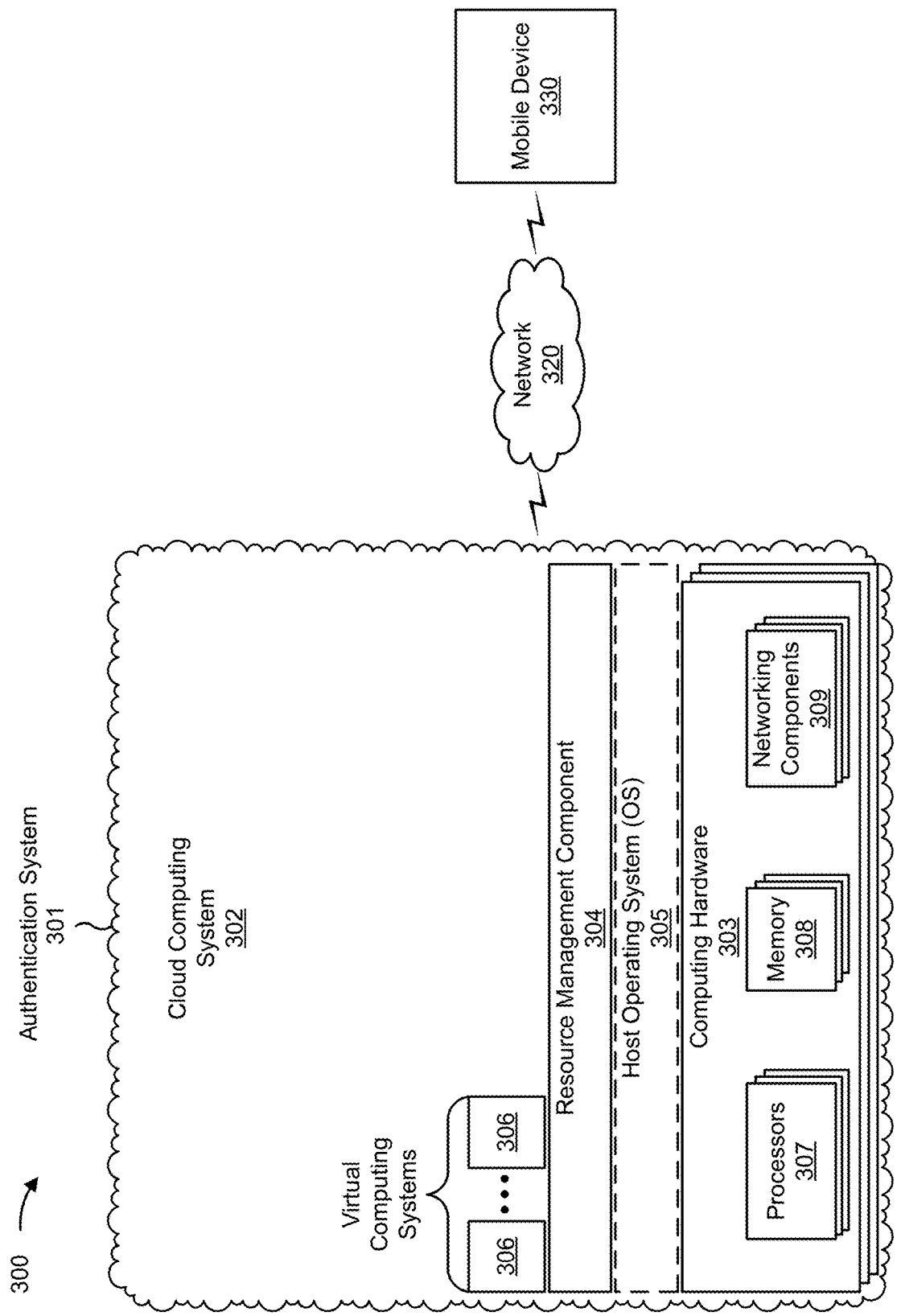

DYNAMIC USER AUTHENTICATION

BACKGROUND

A mobile device may execute an application that displays personally identifiable information (PII) (e.g., national identification numbers, such as social security numbers (SSNs) in the United States, social insurance numbers (SINs) in Canada, SSNs in the Philippines, permanent account numbers (PANs) in India, national insurance numbers (NINOs) in the United Kingdom, employer identification numbers (EINs) in the United States, individual taxpayer identification numbers (ITINs) in the United States, tax identification numbers (TINs) in Costa Rica, and/or other unique or quasi-unique identification numbers, credit card numbers, bank account numbers, passport numbers, and/or other PII) and/or performs sensitive operations (e.g., transfers files to and from a cloud service, transmits and receives emails, and/or other sensitive operations). Accordingly, the application may perform authentication of a user of the mobile device.

SUMMARY

Some implementations described herein relate to a system for dynamic authentication of a user on a mobile device. The system may include one or more memories and one or more processors communicatively coupled to the one or more memories. The one or more processors may be configured to receive, from one or more sensors of the mobile device, measurements associated with the mobile device. The one or more processors may be further configured to receive, from an operating system of the mobile device, an indicator of one or more properties associated with the mobile device. The one or more processors may be configured to receive, from an application of the mobile device, a record of one or more interactions with the application by the user of the mobile device. The one or more processors may be further configured to input the measurements, the indicator, and the record to a model that outputs a score associated with a security level for the user. The one or more processors may be configured to apply one or more rules to the score to determine one or more prompts to authenticate the user. The one or more processors may be further configured to present, while the user is viewing a screen associated with the application, the one or more prompts. The one or more processors may be configured to authenticate the user, based on one or more responses to the one or more prompts, to allow the user to continue viewing the screen.

Some implementations described herein relate to a method of dynamically authenticating a user on a mobile device. The method may include receiving, from a first sensor of the mobile device, measurements indicating a location of the mobile device. The method may further include receiving, from a second sensor of the mobile device, measurements associated with a grip of the user on the mobile device. The method may include inputting indicators of the location and the grip to a model that outputs an indication associated with suspicious activity. The method may further include presenting, while the user is viewing a screen associated with an application using the model, one or more prompts. The method may include determining whether to allow the user to continue viewing the screen based on one or more responses to the one or more prompts.

Some implementations described herein relate to a non-transitory computer-readable medium that stores a set of instructions for dynamically authenticating a user on a mobile device for a device. The set of instructions, when executed by one or more processors of the device, may cause the device to receive, from one or more sensors of the mobile device, measurements indicating a location of the mobile device and measurements associated with a grip of the user on the mobile device. The set of instructions, when executed by one or more processors of the device, may further cause the device to determine, at an operating system of the mobile device, an indicator of one or more properties associated with the mobile device. The set of instructions, when executed by one or more processors of the device, may cause the device to input the measurements and the indicator to a model that outputs a determination of whether the grip, the location, and the one or more properties are consistent with a profile of the user. The set of instructions, when executed by one or more processors of the device, may further cause the device to present, while the user is viewing a screen associated with the operating system, one or more prompts based on output from the model. The set of instructions, when executed by one or more processors of the device, may cause the device to authenticate the user, based on one or more responses to the one or more prompts, to allow the user to continue viewing the screen.

BRIEF DESCRIPTION OF THE DRAWINGS

FIGS. 3 and 4 are diagrams of example environments in which systems and/or methods described herein may be implemented.

DETAILED DESCRIPTION

The following detailed description of example implementations refers to the accompanying drawings. The same reference numbers in different drawings may identify the same or similar elements.

Generally, a mobile application executed on a mobile device uses a set of rules to determine when and how to request authentication from a user of the mobile device. For example, the mobile application may be preconfigured to request a password from the user before displaying a screen with account numbers, SSNs, or other sensitive information. In another example, the mobile application may be preconfigured to request two-factor authentication (e.g., via entry of a code transmitted to an email or phone number associated with the user) before permitting the user to complete a transaction. However, the rigidity of these rules is inconvenient to the user and can result in security holes (e.g., when a screen that includes some sensitive information is not associated with a rule to request authentication from the user). Additionally, the rigidity of these rules often wastes power as well as processing, memory, and network resources by generating unnecessary requests for authentication from the user.

Accordingly, some implementations described herein provide for a dynamic authentication of a user of a mobile device using output from sensors and/or an operating system of the mobile device (optionally along with the user's interactions with a mobile application thereon). For example, the mobile application (and/or the operating system) may determine when and how to prompt the user based on a model that generates a security indicator and/or score. As a result, convenience to the user is increased when output from the sensors and/or the operating system is consistent with a profile of the user, and security is increased when the output is not consistent with a profile of the user. Additionally, the mobile device conserves power as well as processing, memory, and network resources by not generating unnecessary prompts to the user.

Figure 1A:
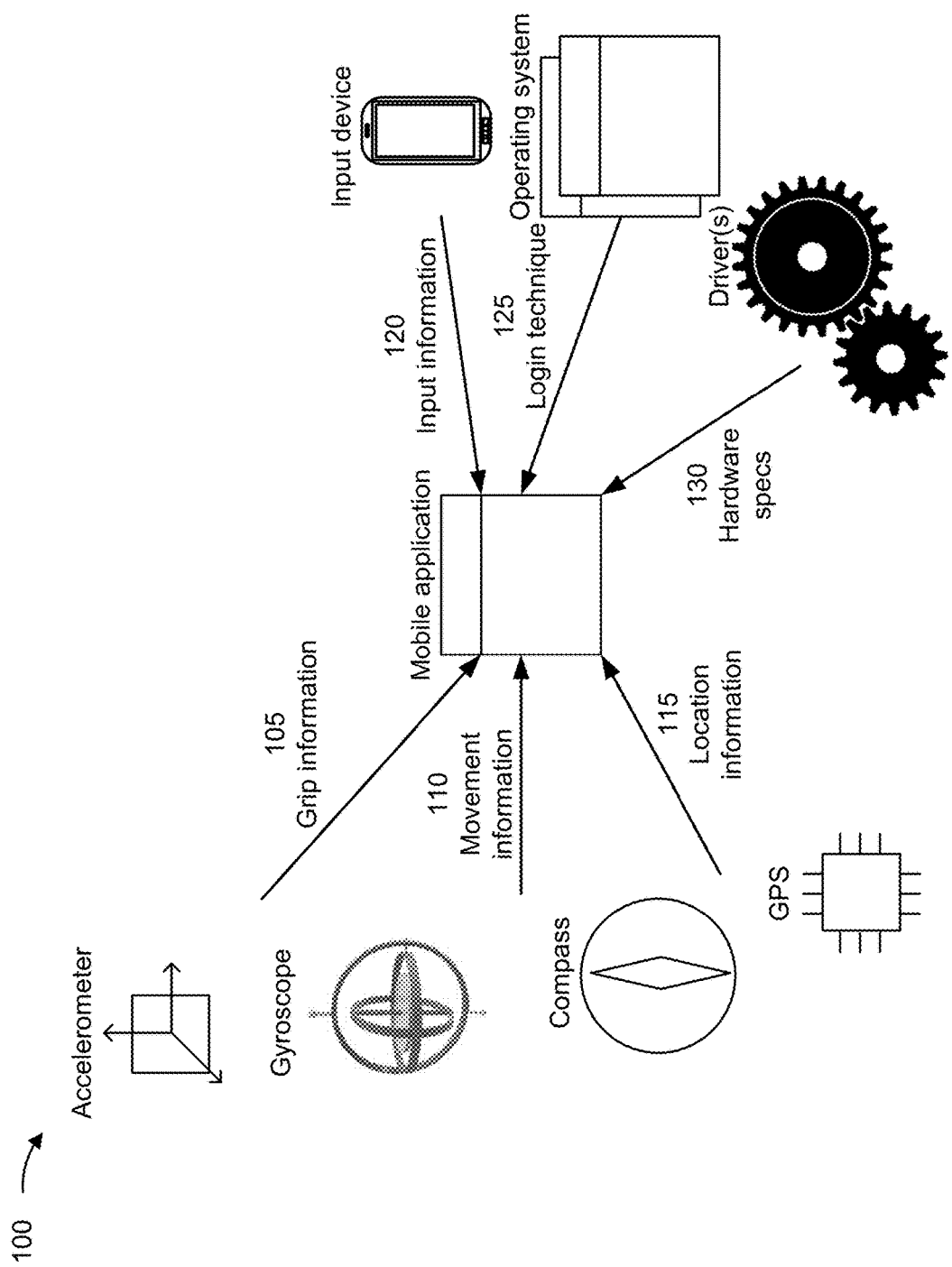
FIGS. 1A, 1B, and 1C are diagrams of an example implementation relating to dynamic user authentication.
Figure 1B:
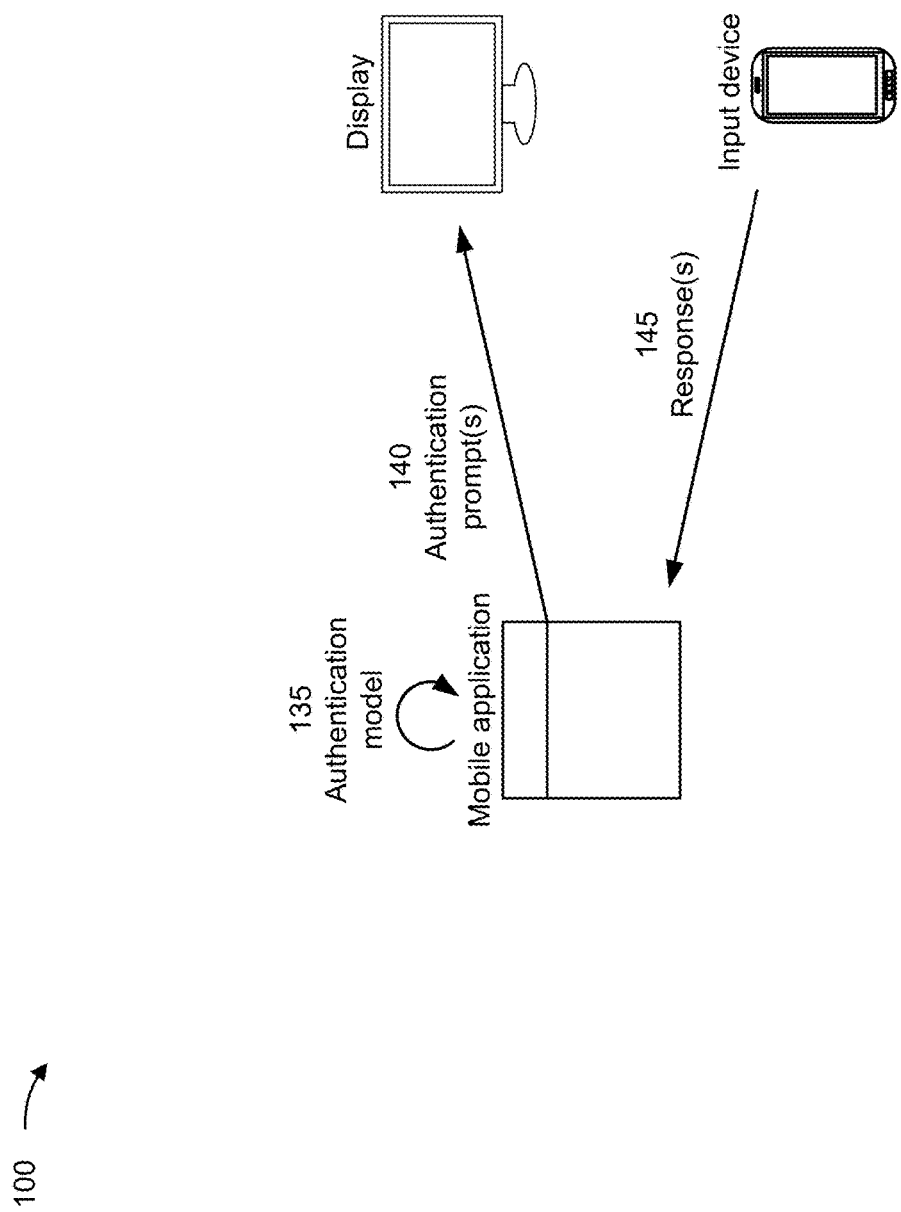
Figure 1C:
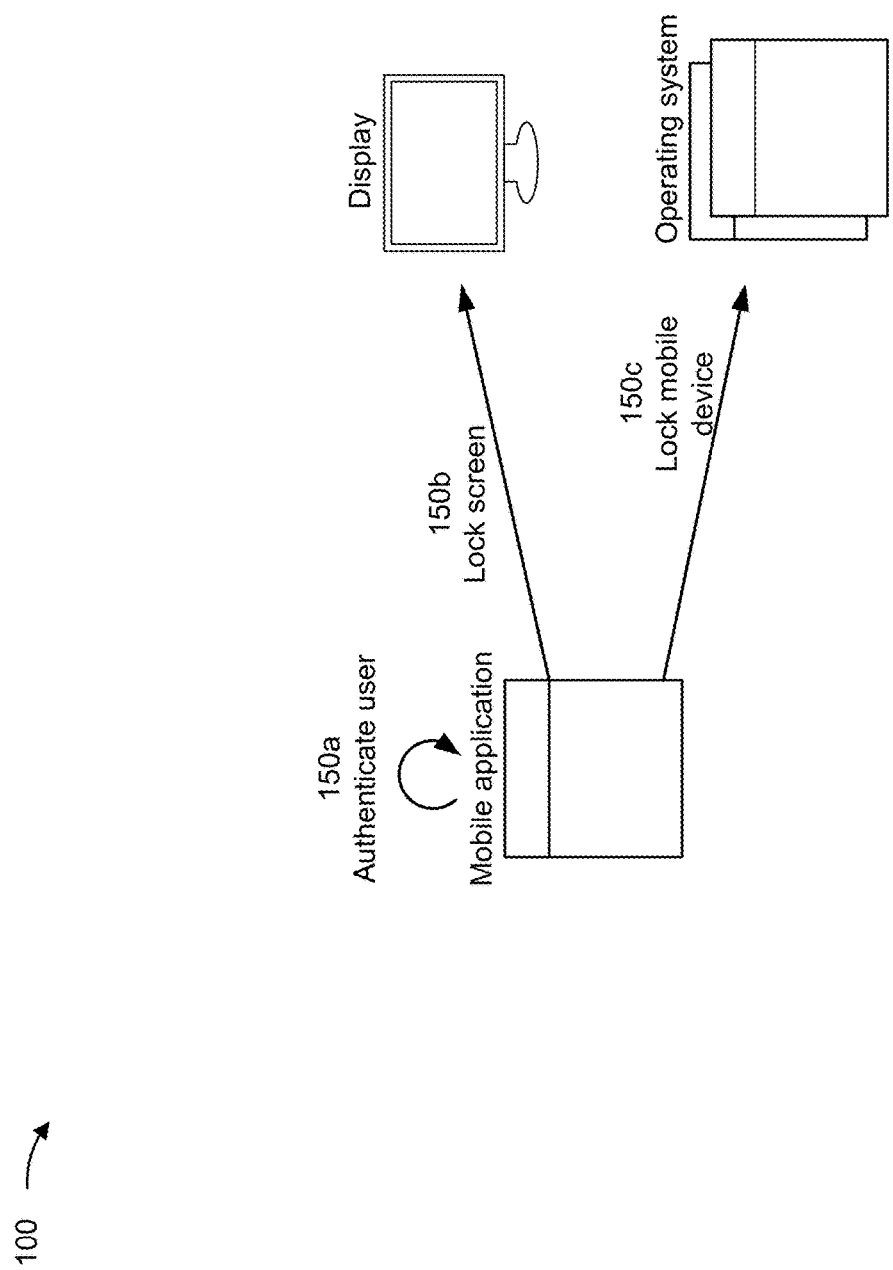

FIGS. 1A-1C are diagrams of an example 100 associated with dynamic user authentication. As shown in FIGS. 1A-1C, example 100 includes a mobile application (e.g., executed on a mobile device), an operating system (e.g., executed on a mobile device), an input device and a display (e.g., associated with the mobile device), and one or more sensors (e.g., associated with the mobile device). These devices are described in more detail in connection with FIGS. 3, 4, and 5.

As shown in FIG. 1A, the mobile application may receive, from sensors (e.g., one or more sensors) of the mobile device, measurements associated with the mobile device. For example, the mobile application may receive the measurements directly from the sensors, via drivers (e.g., one or more drivers) associated with the sensors, or via application programming interfaces (APIs) (e.g., one or more APIs) provided by the operating system.

For example, as shown by reference number 105, the mobile application may receive measurements associated with a grip of the user on the mobile device. The measurements may be determined by an accelerometer, a gyroscope, an altimeter, and/or another similar type of sensor. In some implementations, the measurements may be input to a model that determines a type of the grip such that the mobile application receives an indication of the type of the grip. For example, the type of the grip may include an orientation associated with the grip (e.g., horizontal or vertical for a mobile phone or a tablet), a body part associated with the grip (e.g., whether the mobile device is in a hand of the user or on a leg of the user), a stability associated with the grip (e.g., whether the mobile device is held by the user or is resting on a table or other stable surface), and/or an altitude associated with the grip, among other examples. Accordingly, the model may determine the orientation based on measurements from the gyroscope (e.g., whether rotations of the mobile device are consistent with a vertical or horizontal orientation of the mobile device), determine the body part based on measurements from the accelerometer and/or an optical sensor (e.g., whether movements of the mobile device are consistent with hand tremors or leg tremors), determine the stability based on measurements from the accelerometer and/or an optical sensor (e.g., whether movements of the mobile device are consistent with a stable surface or not), determine the altitude based on measurements from the altimeter and/or the optical sensor (e.g., a height of the mobile device relative to the ground or to a floor), and/or perform similar operations on the measurement to determine the type of grip.

Additionally, or alternatively, as shown by reference number 110, the mobile application may receive measurements associated with movement of the mobile device. The measurements may be determined by a gyroscope, a compass, a speedometer, and/or another similar type of sensor. In some implementations, the measurements may include a magnitude (e.g., a speed associated with the mobile device) and/or a direction (e.g., a heading associated with the mobile device).

Additionally, or alternatively, as shown by reference number 115, the mobile application may receive measurements indicating a location of the mobile device. The measurements may be determined by a compass, a global positioning system (GPS) chip, a magnetometer, and/or another similar type of sensor. In some implementations, the measurements may include an absolute location (e.g., using a geographic coordinate system (GCS)) and/or a relative location (e.g., relative to a nearby landmark or other focal point).

Accordingly, in some implementations, the sensors may include an accelerometer, a compass, a gyroscope, an optical sensor, or a combination thereof. In some implementations, different types of sensors may be combined in a single hardware component. For example, the gyroscope and the accelerometer may be integrated into a single inertial measurement unit (IMU).

Additionally, or alternatively, as shown by reference number 120, the mobile application may receive, from an input device (e.g., a keyboard, a touchscreen, a mouse, a trackpad, and/or another similar type of device generating electrical signals based on physical input from the user) associated with the mobile device, information input by the user of the mobile device. For example, the mobile application may retrieve (e.g., from memory) or otherwise determine a record of interactions (e.g., one or more interactions) with the application by the user of the mobile device. In some implementations, the record may include a login technique used by the user (e.g., a facial identification, a fingerprint identification, a passcode, and/or another type of login technique) for the mobile application, a history of menus accessed by the user (e.g., a path of traversal through different screens of the mobile application), times associated with viewing different screens of the mobile application, and/or other similar information.

Additionally, or alternatively, as shown by reference number 125, the mobile application may receive, from an operating system of the mobile device, an indicator of a property (e.g., one or more properties) associated with the mobile device. For example, the mobile application may request, via an API (e.g., at least one API), the indicator of the property from the operating system. The property may include a version associated with the operating system (e.g., a version number, a build number, and/or another indicator of a version of the operating system), whether the mobile device is rooted or jailbroken, and/or another similar type of property, such as a battery level associated with the mobile device. Additionally, or alternatively, the property may include an indication of a login technique used at the operating system level (e.g., a facial identification, a fingerprint identification, a passcode, and/or another type of login technique). Additionally, or alternatively, the property may include an identifier (e.g., a name, a service set identifier (SSID), a public land mobile network identifier (PLMN ID), a Bluetooth® device address (BD_ADDR), and/or another similar identifier) associated with a network or connection (e.g., a WiFi network, a mobile network like a long term evolution (LTE) network or a 5G New Radio (NR) network, a Bluetooth® device pairing, and/or another network or connection) used and/or managed by the operating system.

Additionally, or alternatively, the property may include a property (e.g., one or more properties) associated with a hardware component (e.g., a processor, a modem, a chipset, a speaker, a microphone, a port, such as a universal serial bus (USB) port, and/or another hardware component) of the mobile device. For example, the property may include a serial number associated with the hardware component, a model number associated with the hardware component, and/or a setting associated with the hardware component (e.g., whether overclocking is enabled for a processor, a volume level associated with a speaker, and/or another similar type of setting), among other examples. Additionally, or alternatively, the property may include an identifier (e.g., an integrated circuit card identifier (ICCID), an international mobile subscriber identity (IMSI) number, and/or another similar identifier) associated with a subscriber identity module (SIM) used by the mobile device (e.g., via a SIM card or an integrated SIM, such as embedded SIM (eSIM)). Accordingly, in some implementations, as shown by reference number 130, the mobile application may receive the property from a driver associated with the hardware component. Alternatively, the mobile application may receive the property from the operating system (e.g., via an API).

Accordingly, as shown in FIG. 1B and by reference number 135, the mobile application may input the measurements, the indicator of the property, and/or the record to a model that outputs a score associated with a security level for the user. In some implementations, the mobile application may input indicators of the location and the grip associated with the mobile device in addition to or in lieu of the measurements. Additionally with, or alternatively to, the score, the model may output an indication associated with suspicious activity and/or a determination of whether the inputs are consistent with a profile of the user. As described in connection with FIG. 3, the model may be at least partially implemented on a remote server associated with the mobile application. Additionally, or alternatively, and as described in connection with FIG. 4, the model may be at least partially implemented locally on the mobile device.

In some implementations, the model may determine the score based at least in part on a similarity between the measurements and historical measurements associated with the user. For example, the model may determine a score associated with valid authentication of the user when the grip is similar to historical grips associated with the user (e.g., a difference between a numerical indicator associated with the grip and a numerical indicator associated with a historical grip satisfies a threshold). Additionally, or alternatively, the model may determine a score associated with valid authentication of the user when the location is similar to historical locations associated with the user (e.g., a distance between the location and a historical location satisfies a threshold). Additionally, or alternatively, the model may determine a score associated with valid authentication of the user when the movement is similar to historical movements associated with the user (e.g., a difference between a speed and/or a heading and a historical speed and/or historical heading, respectively, satisfies a threshold).

Similarly, the model may determine the score based at least in part on a similarity between the record of interactions and historical interactions associated with the user. For example, the model may determine a score associated with valid authentication of the user when the record of interactions is similar to historical interactions associated with the user (e.g., differences between times associated with viewing screens for the mobile application and historical times associated with viewing the same screens satisfy a threshold, a difference between a numerical representation of a path of traversal through screens of the mobile application and historical paths of traversal satisfies a threshold, and/or a login technique matches a historical login technique associated with the user).

Similarly, the model may determine the score based at least in part on a similarity between the property associated with the mobile device and a historical property associated with the user. For example, the model may determine a score associated with valid authentication of the user when the property is similar to the historical property associated with the user (e.g., a version associated with the operating system matches, or is larger than, a historical version associated with the operating system, a rooted or jailbroken status matches a historical status associated with the operating system, a difference between a battery level associated with the mobile device and historical battery levels associated with the user satisfies a threshold, a login technique used at the operating system level matches a historical login technique associated with the user, a network or connection used and/or managed by the operating system matches a historical network or connection used and/or managed by the operating system, a serial number and/or model number associated with a hardware component matches a historical serial number and/or historical modem number, respectively, associated with the hardware component, an identifier associated with a SIM matches a historical identifier associated with the SIM, and/or a difference between a setting associated with a hardware component and historical settings associated with the hardware component satisfies a threshold).

The factors described above contributing to a score associated with valid authentication of the user may similarly contribute to outputting an indication associated with suspicious activity. For example, the model may output a binary indication (e.g., a Boolean) associated with suspicious activity when the score fails to satisfy a threshold (and/or when one or more of the factors described above fail to satisfy a corresponding threshold). In another example, the model may output an indication of a level of suspicious activity detected (e.g., a letter grade and/or another indication selected from three or more options, such as output from a switch statement in C++) based on a range into which the score falls (and/or based on a quantity of factors, described above, that fail to satisfy a corresponding threshold).

Similarly, the factors described above contributing to a score associated with valid authentication of the user may similarly contribute to outputting a determination of whether the inputs are consistent with the profile of the user. For example, the model may output a binary determination (e.g., a Boolean) associated with consistency with the profile of the user when the score satisfies a threshold (and/or when one or more of the factors described above satisfy a corresponding threshold). In another example, the model may output an indication of a level of determination of consistency (e.g., a letter grade and/or another indication selected from three or more options, such as output from a switch statement in C++) based on a range into which the score falls (and/or based on a quantity of factors, described above, that satisfy a corresponding threshold).

As described in connection with FIGS. 2A and 2B, the model may be a machine learning model based on historical data associated with the user. For example, the model may include an artificial neural network (ANN), a linear regression model, and/or another type of machine learning model. The historical data associated with the user may include data recorded and stored by the mobile application during previous executions, data recorded and stored by the operating system during previous uses of the mobile device, and/or data recorded and stored by a remote server, associated with the mobile application, during previous sessions associated with an account that is associated with the user.

The mobile application may use the output from the model to authenticate the user. For example, when the score (or the indication of suspicious activity or the determination of consistency with the profile of the user) satisfies a threshold, the mobile application may permit the user to continue using the mobile application without interruption. Accordingly, the user's experience is improved, and the mobile application conserves power and processing resources of the mobile device by not generating an unnecessary prompt for authentication.

On the other hand, as shown by reference number 140, when the score (or the indication of suspicious activity or the determination of consistency with the profile of the user) does not satisfy the threshold, the mobile application may prompt (e.g., using one or more prompts) the user for authentication. For example, the prompt may include a biometric prompt, a password-based prompt, a two-factor prompt, or a combination thereof. In some implementations, the mobile application may further apply rules (e.g., one or more rules) to the score to determine the prompt to authenticate the user. For example, the mobile application may apply the rules to determine a type of the prompt and/or a quantity of prompts. The rules may accept the score (or the indication of suspicious activity or the determination of consistency with the profile of the user) as input and generate the type and/or the quantity as output. For example, the rules may select different types of prompts (e.g., biometric prompts or two-factor prompts, among other examples) when the score is lower, as compared to the types selected (e.g., password-based prompts, among other examples) when the score is higher. Additionally, or alternatively, the rules may select a larger quantity of prompts when the score is lower as compared to the quantity selected when the score is higher.

Accordingly, as further shown by reference number 140, the mobile application may present, while the user is viewing a screen associated with the application, the prompt. For example, the mobile application may use a display of the mobile device to present the prompt. In some implementations, the mobile application may further obscure at least part of the screen that the user is viewing. Accordingly, because the mobile application may interrupt viewing of any screen based on output from the model, security is increased as compared with rigid rules determining when to prompt the user for authentication.

As shown by reference number 145, the user may provide a response to the prompt. For example, the user may input the response using the input device associated with the mobile device. In implementations where the mobile application uses a plurality of prompts, the user may input responses in succession using the input device.

As described in connection with FIGS. 2A and 2B, the model may be a trained model. Accordingly, in some implementations, the mobile application may update the model based on the response from the user. For example, when the response is used to authenticate the user, the measurements, the property, and/or the record that were input to the model may be used as new historical data associated with the user.

Accordingly, the mobile application may determine whether to allow the user to continue viewing the screen based on the response to the prompt. For example, as shown in FIG. 1C and by reference number 150a, the mobile application may authenticate the user, based on the response to the prompt, to allow the user to continue viewing the screen. As an alternative, and as shown by reference number 150b, the mobile application may lock the screen when the response is classified as incorrect. In some implementations, the mobile application may determine an alternative prompt (e.g., one or more alternative prompts) to present to the user. As an alternative, the mobile application may require the user to wait a preconfigured amount of time or to contact customer support before attempting to access the mobile application again.

Rather than lock the screen, the mobile application may instead terminate the application when the response is classified as incorrect. Additionally, the mobile application may require the user to wait a preconfigured amount of time or to contact customer support before attempting to access the mobile application again.

As an alternative, and as shown by reference number 150c, the mobile application may instruct the operating system to freeze applications (e.g., one or more applications) executing on the operating system or even to lock the mobile device itself. As a result, the mobile application increases security by blocking access to other sensitive information associated with other applications and/or the operating system itself. In some implementations, the operating system may determine a prompt (e.g., one or more prompts) to present to the user to unfreeze the applications or unlock the device. As an alternative, the operating system may require the user to wait a preconfigured amount of time or to contact customer support before attempting to access the frozen applications, or even the mobile device itself, again.

The operations described in connection with reference number 150b and 150c may alternatively be performed when the score (or the indication of suspicious activity or the determination of consistency with the profile of the user) does not satisfy a threshold. For example, when the score is sufficiently low, the mobile application may determine to lock the screen and/or the mobile device without providing an opportunity for the user to authenticate. As a result, the mobile application increases security and conserves power and processing resources of the mobile device when someone who is apparently not the user is attempting to access the mobile application.

The operations described in connection with example 100 may be iterative. For example, the mobile application may receive updated measurements, an updated property, and/or an updated record of interactions and re-apply the model accordingly. As a result, the mobile application may periodically (and/or at preconfigured menus of the mobile application) apply the model to determine whether to allow the user to continue viewing an updated screen associated with the mobile application. A periodic model therefore provides greater security compared to rigid rules determining when to prompt the user for authentication. Additionally, the periodic model can conserve power and processing resources at the mobile device by not generating unnecessary prompts for authentication.

In example 100, the model is stored and applied at the application of the mobile device. As an alternative, the model may be stored and applied at the operating system of the mobile device. Accordingly, the operating system may periodically apply the model to determine whether to allow the user to continue using the mobile device in general.

As indicated above, FIGS. 1A-1C are provided as an example. Other examples may differ from what is described with regard to FIGS. 1A-1C.

Figure 2A:
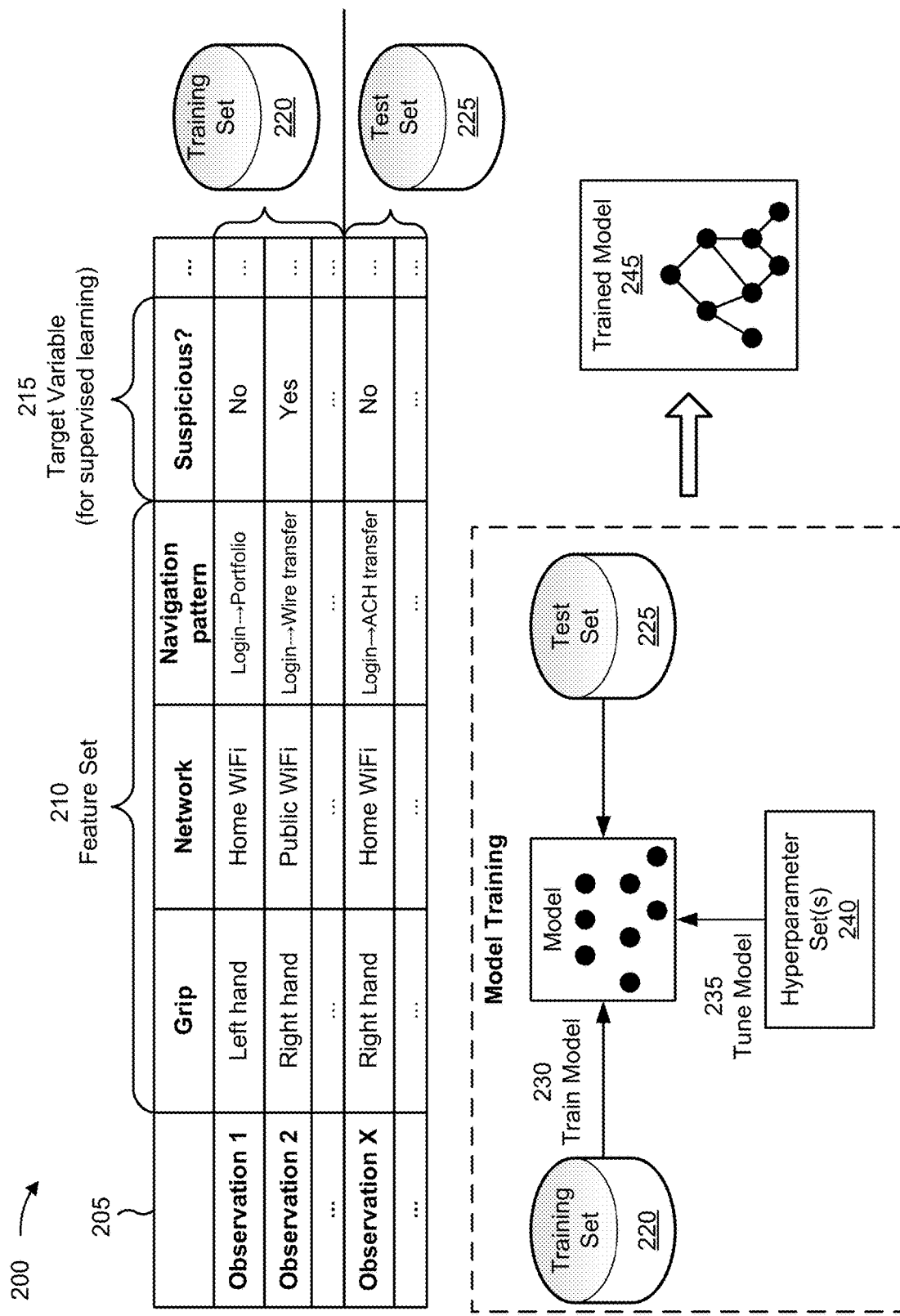
FIGS. 2A and 2B are diagrams of an example relating to training and applying a machine learning model in connection with dynamic user authentication.
Figure 2B:
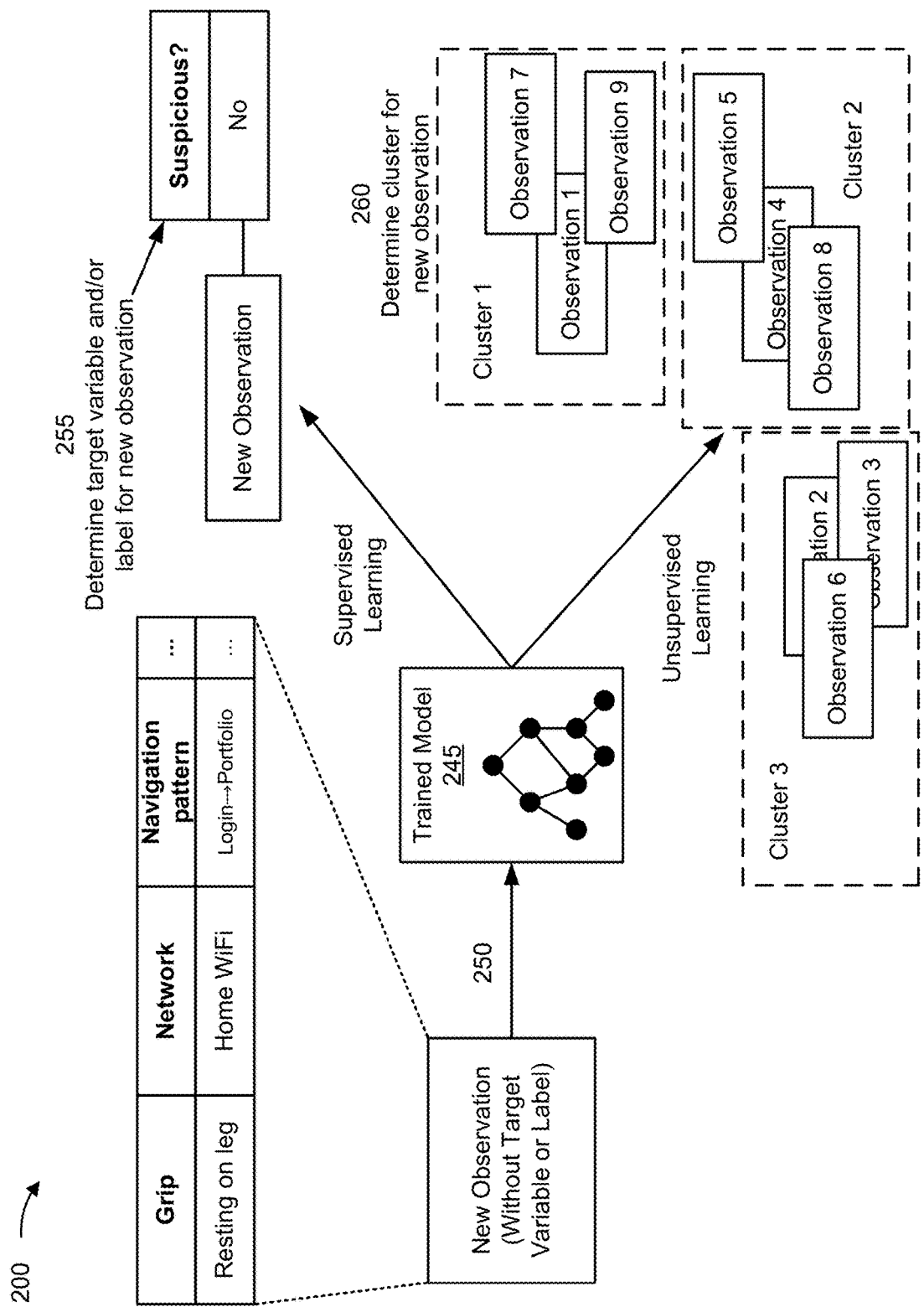

FIGS. 2A and 2B are diagrams illustrating an example 200 of training and applying a machine learning model in connection with dynamic user authentication. The machine learning model training described herein may be performed using a machine learning system. The machine learning system may include or may be included in a computing device, a server, a cloud computing environment, or the like, such as the authentication system and/or the mobile system described in more detail below.

As shown by reference number 205, a machine learning model may be trained using a set of observations. The set of observations may be obtained and/or input from training data (e.g., historical data), such as data gathered during one or more processes described herein. For example, the set of observations may include data gathered from sensors, an operating system, and/or a mobile application, as described elsewhere herein. In some implementations, the machine learning system may receive the set of observations (e.g., as input) from the authentication system and/or the mobile system.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the authentication system and/or the mobile system. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of a type of grip, a second feature of a network in use, a third feature of a navigation pattern through an application, and so on. As shown, for a first observation, the first feature may have a value of a left hand grip, the second feature may have a value of a home WiFi network, the third feature may have a value of navigation from a login screen to a portfolio screen, and so on. These features and feature values are provided as examples, and may differ in other examples. For example, the feature set may include one or more of the following features: a location associated with a mobile device, a movement associated with the mobile device, a property associated with an operating system, and/or a property associated with a hardware component, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 200, the target variable is an indication associated with suspicious activity, which has a value of "No" for the first observation. For example, the indication may be used to determine whether to prompt a user for authentication.

The feature set and target variable described above are provided as examples, and other examples may differ from what is described above. For example, for a target variable of a score associated with a security level, the feature set may include a type of grip, a network in use, a navigation pattern through an application, a location associated with a mobile device, a movement associated with the mobile device, a property associated with an operating system, and/or a property associated with a hardware component, among other examples. In another example, for a target variable of a determination of consistency with a profile of a user, the feature set may include a type of grip, a network in use, a navigation pattern through an application, a location associated with a mobile device, a movement associated with the mobile device, a property associated with an operating system, and/or a property associated with a hardware component, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k-1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 245.

FIG. 2B illustrates applying the trained machine learning model to a new observation associated with user authentication. The new observation may be input to a machine learning system that stores a trained machine learning model 245. The machine learning system may include or may be included in a computing device, a server, or a cloud computing environment, such as the authentication system.

As shown by reference number 250, the machine learning system may receive a new observation (or a set of new observations), and may input the new observation to the machine learning model 245. As shown, the new observation may include a first feature of a grip associated with resting on a leg, a second feature of a home WiFi network connection, a third feature of navigation from a logic screen to a portfolio screen, and so on, as an example. The machine learning system may apply the trained machine learning model 245 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 245 may predict a value of "No" for the target variable of indication of suspicious activity for the new observation, as shown by reference number 255. Based on this prediction (e.g., based on the value having a particular label or classification or based on the value satisfying or failing to satisfy a threshold), the machine learning system may provide a recommendation and/or output for determination of a recommendation, such as a recommendation not to prompt a user for authentication. Additionally, or alternatively, the machine learning system may perform an automated action and/or may cause an automated action to be performed (e.g., by instructing another device to perform the automated action), such as generating a type of prompt and/or a quantity of prompts associated with lesser security risk. As another example, if the machine learning system were to predict a value of "Yes" for the target variable of indication of suspicious activity, then the machine learning system may provide a different recommendation (e.g., a recommendation to prompt a user for authentication) and/or may perform or cause performance of a different automated action (e.g., generating a type of prompt and/or a quantity of prompts associated with greater security risk, locking a screen associated with an application, freezing applications associated with a mobile device, and/or locking a mobile device, among other examples). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 245 may classify (e.g., cluster) the new observation in a cluster, as shown by reference number 260. The observations within a cluster may have a threshold degree of similarity. As an example, if the machine learning system classifies the new observation in a first cluster (e.g., most secure), then the machine learning system may provide a first recommendation, such as a recommendation not to prompt a user for authentication. Additionally, or alternatively, the machine learning system may perform a first automated action and/or may cause a first automated action to be performed (e.g., by instructing another device to perform the automated action) based on classifying the new observation in the first cluster, such as allowing the user to continue viewing a screen. As another example, if the machine learning system were to classify the new observation in a second cluster (e.g., less secure), then the machine learning system may provide a second (e.g., different) recommendation (e.g., a recommendation to generate one prompt for authentication) and/or may perform or cause performance of a second (e.g., different) automated action, such as generate a password-based prompt. As another example, if the machine learning system were to classify the new observation in a third cluster (e.g., least secure), then the machine learning system may provide a third (e.g., different) recommendation (e.g., a recommendation to generate two or more prompts for authentication) and/or may perform or cause performance of a third (e.g., different)

automated action, such as generate a biometric-based prompt and/or a two-factor prompt.

In this way, the machine learning system may apply a rigorous and automated process to dynamically authenticating a user. The machine learning system enables recognition and/or identification of tens, hundreds, thousands, or millions of features and/or feature values for tens, hundreds, thousands, or millions of observations, thereby increasing accuracy and consistency and reducing delay associated with authenticating a user relative to requiring computing resources to be allocated for tens, hundreds, or thousands of operators to manually determine authentication rules using the features or feature values.

As indicated above, FIGS. 2A-2B are provided as an example. Other examples may differ from what is described in connection with FIGS. 2A-2B. For example, the machine learning model may be trained using a different process than what is described in connection with FIG. 2A. Additionally, or alternatively, the machine learning model may employ a different machine learning algorithm than what is described in connection with FIGS. 2A-2B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

FIG. 3 is a diagram of an example environment 300 in which systems and/or methods described herein may be implemented. As shown in FIG. 3, environment 300 may include an authentication system 301, which may include one or more elements of and/or may execute within a cloud computing system 302. The cloud computing system 302 may include one or more elements 303-306, as described in more detail below. As further shown in FIG. 3, environment 300 may include a network 320 and a mobile device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines. Additionally, or alternatively, the resource management component 304 may include a container manager, such as when the virtual computing systems 306 are containers. In some implementations, the resource management component 304 executes within and/or in coordination with a host operating system 305.

A virtual computing system 306 includes a virtual environment that enables cloud-based execution of operations and/or processes described herein using computing hardware 303. A virtual computing system 306 may execute one or more applications using a file system that includes binary files, software libraries, and/or other resources required to execute applications on a guest operating system (e.g., within the virtual computing system 306) or the host operating system 305.

Although the authentication system 301 may include one or more elements 303-306 of the cloud computing system 302, may execute within the cloud computing system 302, and/or may be hosted within the cloud computing system 302, in some implementations, the authentication system 301 may not be cloud-based (e.g., may be implemented outside of a cloud computing system) or may be partially cloud-based. For example, the authentication system 301 may include one or more devices that are not part of the cloud computing system 302, such as device 500 of FIG. 5, which may include a standalone server or another type of computing device. The authentication system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The mobile device 330 may include one or more devices capable of using the authentication system 301 to dynamically authenticate a user. The mobile device 330 may include a communication device. For example, the mobile device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The mobile device 330 may communicate with the authentication system 301 to determine when (and how) to prompt a user for authentication, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
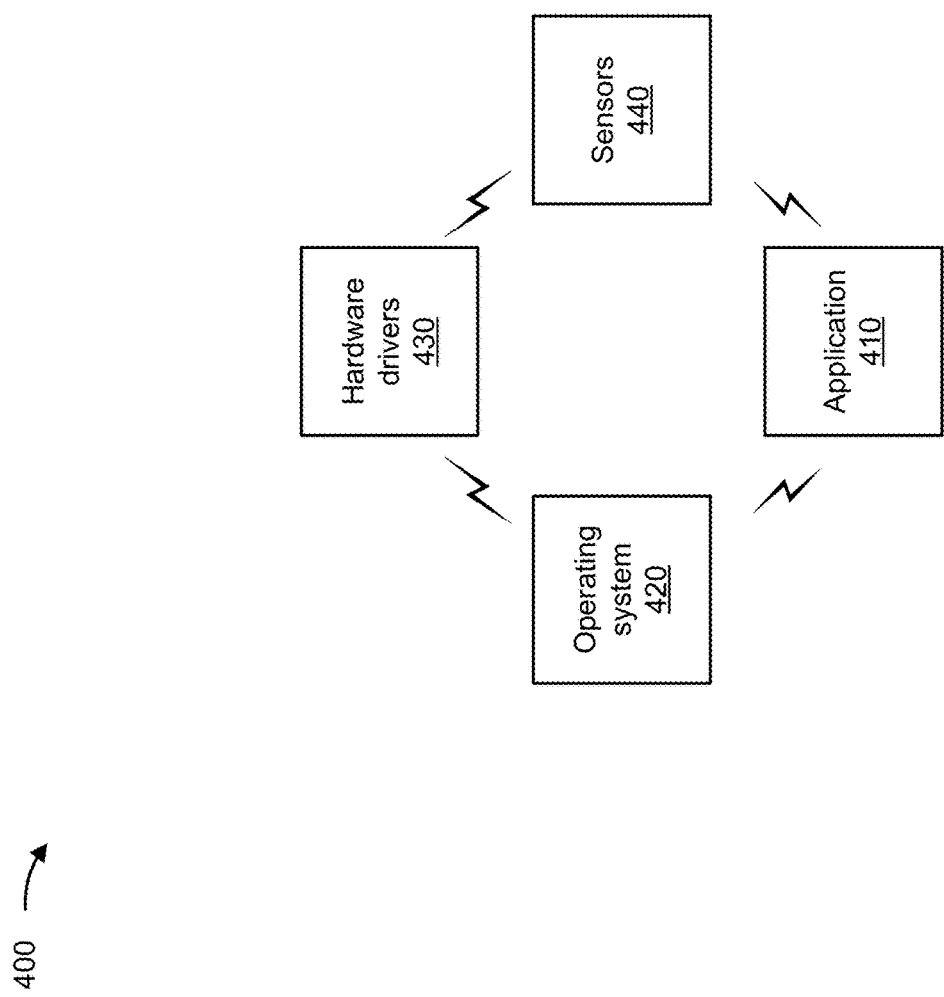

FIG. 4 is a diagram of an example environment 400 in which systems and/or methods described herein may be implemented. As shown in FIG. 4, environment 400 may be a mobile system and may include an application 410, an operating system 420 (e.g., supporting the application), hardware drivers 430 (e.g., cooperating with the operating system 420), and sensors 440, as described in more detail below. Devices and/or elements of environment 400 may interconnect via wired connections and/or wireless connections.

The application 410 may include an executable capable of running within the mobile system using the operating system 420. The application 410 may dynamically authenticate a user, as described herein. Additionally, or alternatively, the application 410 may communicate with the operating system 420 to determine when (and how) to prompt a user for authentication, as described elsewhere herein. In some implementations, the application 410 may communicate directly with the sensors 440 rather than through the hardware drivers 430 and the operating system 420.

Figure 5:
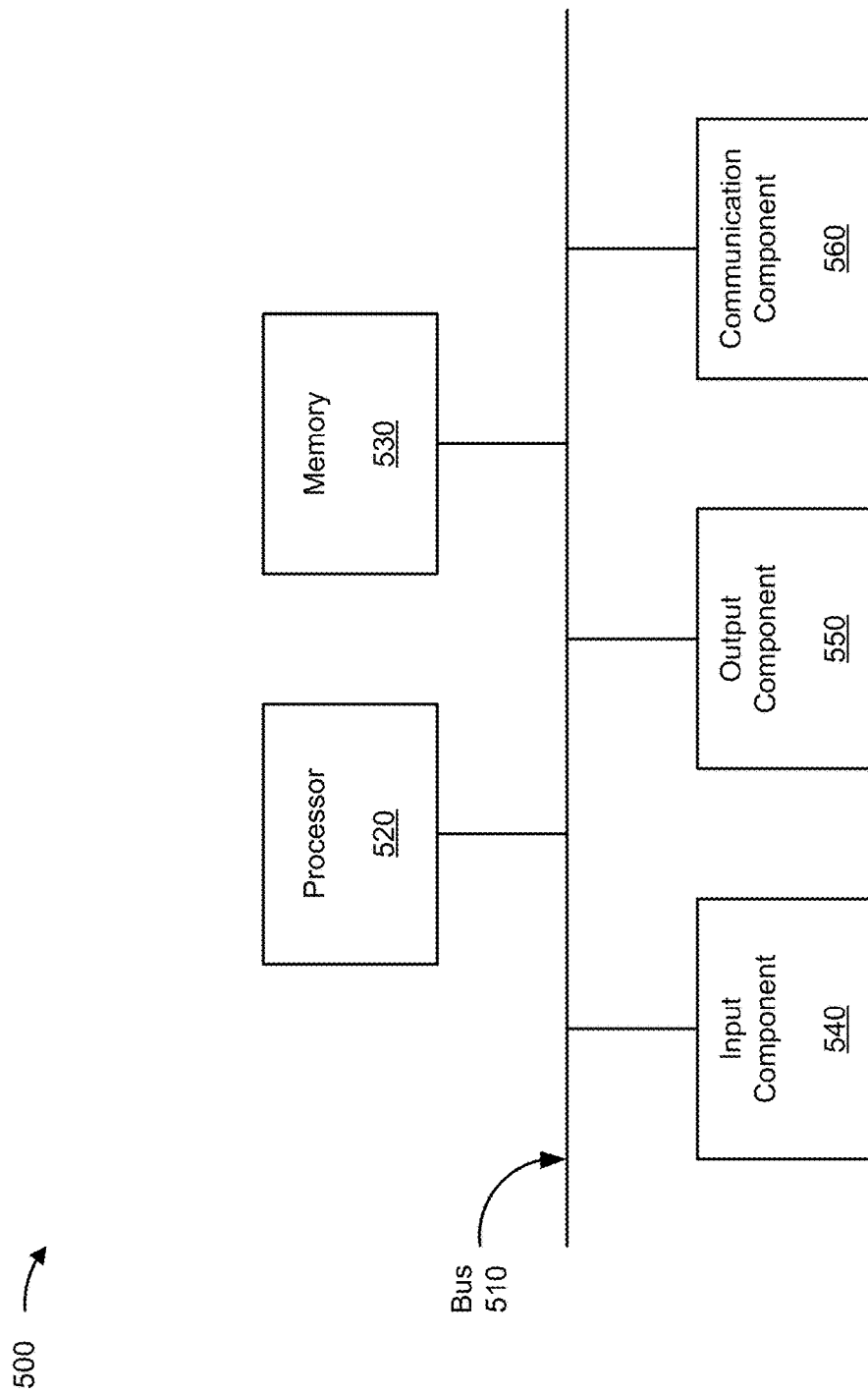
FIG. 5 is a diagram of example components of one or more devices of FIGS. 3 and 4.

The operating system 420 may include system software capable of managing hardware of the mobile system (which may include, for example, one or more components of device 500 of FIG. 5) and providing an environment for execution of higher-level software, such as the application 410. For example, the operating system 420 may include a kernel (e.g., a Windows-based kernel, a Linux kernel, a Unix-based kernel, such as an Android kernel, an iOS kernel, and/or another type of kernel) managing the hardware and library functions that may be used by the higher-level software. The operating system 420 may additionally provide a graphical user interface (GUI) and process input from a user of the mobile system.

The hardware drivers 430 may include software that allows the operating system 420 to provide commands to and receive information from the hardware of the mobile system. In some implementations, the hardware drivers 430 may be at least partially integrated into the kernel of the operating system. Additionally, or alternatively, the hardware drivers 430 may at least partially operate independently of the kernel.

The sensors 440 may include a gyroscope, an accelerometer, a magnetometer, a compass, a speedometer, a GPS chip, an altimeter, an optical sensor, and/or another type of sensor included in the mobile system. The hardware drivers 430 may provide measurements from the sensors 440 to the operating system 420 (e.g., for use by the application 410). Additionally, in some implementations, the sensors 440 may provide measurements directly to the application 410 (e.g., via a dedicated hardware pipeline from the sensors 440 to an applications processor on which the application 410 executes).

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

FIG. 5 is a diagram of example components of a device 500, which may correspond to an authentication system and/or a mobile device. In some implementations, an authentication system and/or a mobile device include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
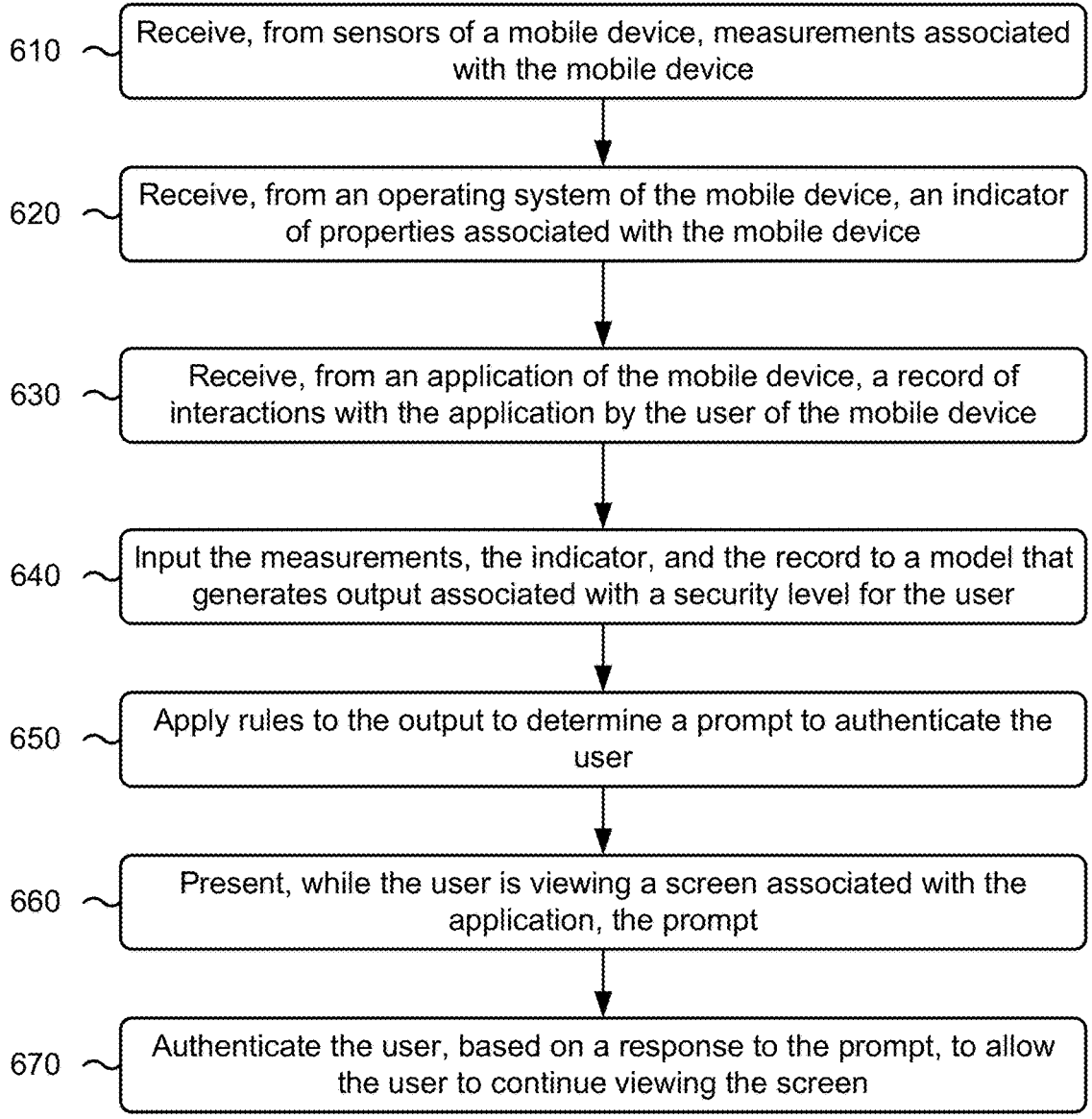
FIG. 6 is a flowchart of an example process relating to dynamic user authentication.

FIG. 6 is a flowchart of an example process 600 associated with dynamic user authentication. In some implementations, one or more process blocks of FIG. 6 may be performed by a system (e.g., authentication system 301 or mobile system 400). In some implementations, one or more process blocks of FIG. 6 may be performed by another device or a group of devices separate from or including the system, such as mobile device 330. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving, from sensors of a mobile device, measurements associated with the mobile device (block 610). As further shown in FIG. 6, process 600 may include receiving, from an operating system of the mobile device, an indicator of properties associated with the mobile device (block 620). As further shown in FIG. 6, process 600 may include receiving, from an application of the mobile device, a record of interactions with the application by the user of the mobile device (block 630). Accordingly, as shown in FIG. 6, process 600 may include inputting the measurements, the indicator, and the record to a model that generates output (e.g., a score, an indication, or a determination) associated with a security level for the user (block 640). As further shown in FIG. 6, process 600 may include applying rules to the output to determine a prompt to authenticate the user (block 650). Accordingly, as shown in FIG. 6, process 600 may include presenting, while the user is viewing a screen associated with the application, the prompt (block 660). As further shown in FIG. 6, process 600 may include authenticating the user, based on a response to the prompt, to allow the user to continue viewing the screen (block 670).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for dynamic authentication of a user on a mobile device, the system comprising:
one or more memories; and
one or more processors, communicatively coupled to the one or more memories, configured to:
receive, from one or more sensors of the mobile device, measurements associated with
a grip on the mobile device;
receive, from an operating system of the mobile device, an indicator of one or more properties associated with the mobile device, wherein the one or more properties include
whether the mobile device is rooted or jailbroken;
receive, from an application of the mobile device, a record of one or more interactions with the application by the user of the mobile device;
input the measurements, the indicator of the one or more properties, and the record to a model that determines a score associated with a security level for the user, wherein determining the score is, at least in part, based on a difference between a numerical indicator associated with the grip and a numerical indicator associated with historical grips satisfying a threshold;
apply one or more rules to the score to determine one or more prompts to authenticate the user, wherein determining the one or more prompts comprises:
determining, based on the score, a type of prompt to generate, and
determining, based on the score, a quantity of prompts to generate;
present, while the user is viewing a screen associated with the application, the one or more prompts; and
authenticate the user, based on one or more responses to the one or more prompts, to allow the user to continue viewing the screen.

2. The system of claim 1, wherein the model is stored and applied at the operating system of the mobile device.

3. The system of claim 1, wherein the model is stored and applied at the application of the mobile device.

4. The system of claim 1, wherein the one or more sensors comprise an accelerometer, a compass, a gyroscope, an optical sensor, or a combination thereof.

5. The system of claim 1, wherein the one or more interactions comprise a login technique used by the user, a history of menus accessed by the user, and a time associated with viewing a screen of the application.

6. The system of claim 1, wherein the one or more processors, to present the one or more prompts, are configured to:
obscure at least part of the screen that the user is viewing, or
freeze one or more applications executing on the operating system.

7. The system of claim 1, wherein the one or more processors are further configured to:
terminate the application when at least one of the one or more responses are classified as incorrect, and
cause the application to require the user to contact customer support before attempting to access the application again.

8. The system of claim 1, wherein the measurements include measurements associated with a location of the mobile device, and
wherein the score is, at least in part, determined based on a distance between the location and a historical location satisfying a threshold.

9. A method of dynamically authenticating a user on a mobile device, comprising:
receiving, from a first sensor of the mobile device, measurements indicating a location of the mobile device;
receiving, from a second sensor of the mobile device, measurements associated with a grip of the user on the mobile device;
receiving, from an operating system of the mobile device, an indicator of one or more properties associated with the mobile device, wherein the one or more properties include an indication of whether the mobile device is rooted or jailbroken;
inputting the indicator of the one or more properties associated with the mobile device and an indicator of the location and an indicator of the grip to a model that outputs an indication associated with suspicious activity,
wherein outputting the indication is, at least in part, based on a difference between a numerical indicator associated with the grip and a numerical indicator associated with historical grips satisfying a threshold;
applying one or more rules to the indication to determine a type and a quantity of one or more prompts to authenticate the user;
presenting, while the user is viewing a screen associated with an application using the model, the one or more prompts; and
determining whether to allow the user to continue viewing the screen based on one or more responses to the one or more prompts.

10. The method of claim 9, further comprising:
receiving, from the first sensor of the mobile device, updated measurements indicating an updated location of the mobile device;
receiving, from the second sensor of the mobile device, updated measurements associated with an updated grip of the user on the mobile device;
inputting indicators of the updated location and the updated grip to the model, wherein the model outputs an updated indication associated with suspicious activity; and
determining to allow the user to continue viewing an updated screen based on the updated indication.

11. The method of claim 9, wherein determining whether to allow the user to continue viewing the screen comprises:
terminating the application when the one or more responses are classified as incorrect.

12. The method of claim 9, wherein determining whether to allow the user to continue viewing the screen comprises:
locking the screen when the one or more responses are classified as incorrect.

13. The method of claim 9, wherein the model is stored on a memory of the mobile device.

14. A non-transitory computer-readable medium storing a set of instructions for dynamically authenticating a user on a mobile device, the set of instructions comprising:
one or more instructions that, when executed by one or more processors of a device, cause the device to:
receive, from one or more sensors of the mobile device, measurements indicating a location of the mobile device and measurements associated with a grip of the user on the mobile device;
determine, at an operating system of the mobile device, an indicator of one or more
properties associated with the mobile device, wherein the one or more properties include
whether the mobile device is rooted or jail broken
input the measurements and the indicator of the one or more properties to a model that outputs a determination of whether the grip, the location, and the one or more properties are consistent with a profile of the user,
wherein outputting the determination is, at least in part, based on a difference between a numerical indicator associated with the grip and a numerical indicator associated with historical grips satisfying a threshold;
apply one or more rules to the output from the model to determine a type and a quantity of one or more prompts to authenticate the user;
present, while the user is viewing a screen associated with the operating system, the one or more prompts; and authenticate the user, based on one or more responses to the one or more prompts, to allow the user to continue viewing the screen.

15. The non-transitory computer-readable medium of claim 14, wherein the one or more prompts comprise a biometric prompt, a password-based prompt, a two-factor prompt, or a combination thereof.

16. The non-transitory computer-readable medium of claim 14, wherein the model is a machine learning model based on historical data associated with the user.

17. The non-transitory computer-readable medium of claim 14, wherein the one or more instructions, when executed by the one or more processors, further cause the device to:

update the model based on the one or more responses.

18. The non-transitory computer-readable medium of claim 14, wherein the one or more instructions, that cause the device to present the one or more prompts, cause the device to:

obscure at least part of the screen that the user is viewing.

19. The non-transitory computer-readable medium of claim 14, wherein the one or more instructions, that cause the device to present the one or more prompts, cause the device to:

freeze one or more applications executing on the operating system.

20. The non-transitory computer-readable medium of claim 14, wherein outputting the determination is, at least in part, based on a distance between the location and a historical location satisfying a threshold.

\* \* \* \* \*